(12) United States Patent
Wei et al.

(10) Patent No.: US 11,937,173 B2
(45) Date of Patent: Mar. 19, 2024

(54) METHOD AND APPARATUS FOR SELECTING CELL TO BE CAMPED ON

(71) Applicant: Huawei Technologies Co., Ltd., Shenzhen (CN)

(72) Inventors: Jingxin Wei, Beijing (CN); Lei Han, Beijing (CN); Kun Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/989,164

(22) Filed: Aug. 10, 2020

(65) Prior Publication Data

US 2020/0374788 A1    Nov. 26, 2020

Related U.S. Application Data

(63) Continuation of application No. PCT/CN2019/073974, filed on Jan. 30, 2019.

(30) Foreign Application Priority Data

Feb. 11, 2018 (CN) .......................... 201810143299.4

(51) Int. Cl.
*H04W 48/16* (2009.01)
*H04W 48/10* (2009.01)
*H04W 48/20* (2009.01)

(52) U.S. Cl.
CPC ........... *H04W 48/16* (2013.01); *H04W 48/10* (2013.01); *H04W 48/20* (2013.01)

(58) Field of Classification Search
CPC ...... H04W 48/16; H04W 48/10; H04W 48/20
See application file for complete search history.

(56) References Cited

U.S. PATENT DOCUMENTS 6,771,960 B1 *   8/2004  Otting ................... H04W 48/16
                                                                    455/515
9,924,493 B1 *   3/2018  Govindassamy ... H04L 27/2601
(Continued)

FOREIGN PATENT DOCUMENTS

CN          101426255 A         5/2009
CN          103634800 A         3/2014
(Continued)

OTHER PUBLICATIONS

Nokia, et al., "Beam measurements in NR," 3GPP TSG-RAN WG4 Meeting #81, R4-1609327, Reno, USA, Nov. 14-18, 2016, 6 pages.
(Continued)

*Primary Examiner* — Steven S Kelley
(74) *Attorney, Agent, or Firm* — Conley Rose, P.C.

(57) ABSTRACT

A method includes selecting N cells waiting to be camped on from a candidate cell list, decoding a Physical Broadcast Channel (PBCH) of each of the selected N cells waiting to be camped on, selecting, from at least one cell whose PBCH is successfully decoded, one cell as a cell continuing waiting to be camped on, and when a remaining minimum system information (RMSI) decoding result of the cell continuing waiting to be camped on indicates that the cell continuing waiting to be camped on meets a camping criterion, determining the cell continuing waiting to be camped on as the cell to be camped on.

20 Claims, 8 Drawing Sheets

(56) References Cited

U.S. PATENT DOCUMENTS

| | | | | |
|---|---|---|---|---|
| 2004/0224684 | A1* | 11/2004 | Dorsey | H04W 48/16 |
| | | | | 455/437 |
| 2005/0079870 | A1* | 4/2005 | Rick | H04W 60/04 |
| | | | | 455/437 |
| 2009/0067386 | A1* | 3/2009 | Kitazoe | H04J 11/0069 |
| | | | | 370/332 |
| 2014/0086173 | A1* | 3/2014 | Sadeghi | H04L 5/003 |
| | | | | 370/328 |
| 2015/0365834 | A1* | 12/2015 | Maurya | H04W 48/20 |
| | | | | 455/434 |
| 2016/0021601 | A1 | 1/2016 | Zhang | |
| 2016/0337931 | A1* | 11/2016 | Wang | H04W 36/36 |
| 2017/0048780 | A1* | 2/2017 | Qi | H04W 36/0061 |
| 2017/0070931 | A1* | 3/2017 | Huang | H04W 36/36 |
| 2017/0078999 | A1* | 3/2017 | Dai | H04W 48/20 |
| 2017/0238217 | A1 | 8/2017 | Futaki | |
| 2017/0353254 | A1 | 12/2017 | Islam et al. | |
| 2017/0353257 | A1 | 12/2017 | Islam et al. | |
| 2018/0152924 | A1 | 5/2018 | Ouchi | |
| 2018/0167946 | A1* | 6/2018 | Si | H04W 72/30 |
| 2020/0162222 | A1* | 5/2020 | Liu | H04L 5/0053 |
| 2020/0404537 | A1* | 12/2020 | Harada | H04W 28/06 |

FOREIGN PATENT DOCUMENTS

| | | |
|---|---|---|
| CN | 104105162 A | 10/2014 |
| CN | 107615828 A | 1/2018 |
| WO | 2010105402 A1 | 9/2010 |
| WO | 2017155138 A1 | 9/2017 |
| WO | 2017210339 A1 | 12/2017 |
| WO | 2018016922 A1 | 1/2018 |

OTHER PUBLICATIONS

Vivo, "Remaining aspects on NR-PBCH contents and payload," 3GPP TSG RAN WG1 Meeting #91, R1-1719757, Reno, USA, Nov. 27-Dec. 1, 2017, 6 pages.

Ericsson, "Remaining SS block and SS burst set design," 3GPP TSG RAN WG1 Meeting #90, R1-1714034, Prague, Czech Republic, Aug. 21-25, 2017, 2 pages.

Huawei et al., "On QCL indication and time repetition of SS blocks," 3GPP TSG RAN WG1 Meeting NR#3, R1-1715565, Nagoya, Japan, Sep. 18-21, 2017, 2 pages.

B. Wang, "Research on LTE Positioning Technology Based on TDOA Parameter Estimation," 2016, 2 pages (abstract).

* cited by examiner

METHOD AND APPARATUS FOR SELECTING CELL TO BE CAMPED ON

CROSS-REFERENCE TO RELATED APPLICATIONS

This application is a continuation of International Patent Application No. PCT/CN2019/073974, filed on Jan. 30, 2019, which claims priority to Chinese Patent Application No. 201810143299.4, filed on Feb. 11, 2018. The disclosures of the aforementioned applications are hereby incorporated by reference in their entireties.

TECHNICAL FIELD

This application relates to the communications field, and in particular, to a method and an apparatus for selecting a cell to be camped on.

BACKGROUND

In a 5th generation (5G) communications technology, application of a high-band spectrum resource becomes an effective manner for implementing high data rate communication. However, due to a high-band radio propagation characteristic, a 5G high-frequency signal is severely attenuated. To effectively enhance signal coverage and overcome path attenuation in a high band, a multi-beam communications technology is introduced to 5G. Both a base station and user equipment (UE) have a plurality of beams with different directions. However, a signal gain is strongest only in a particular direction. Therefore, when UE is to camp on a cell at a high frequency, the UE usually attempts to use a plurality of receive beams, in an embodiment, selects, through receive beam sweeping, an appropriate cell to be camped on.

When performing initial receive beam sweeping, the UE obtains a plurality of cells by sweeping a plurality of beams. If the UE sequentially decodes, according to an existing cell camping process, physical broadcast channels (PBCH) and remaining minimum system information (RMSI) of the obtained plurality of cells, to select an appropriate cell to be camped on, time may be wasted in some cells with signal fluctuation or instability. In this case, a cell camping delay is increased, and a cell camping success rate is reduced. Therefore, how to implement fast and accurate cell camping becomes a problem.

SUMMARY

Embodiments of this application provide a method and an apparatus for selecting a cell to be camped, to reduce a cell camping delay and increase a camping success rate.

A first aspect of this application provides a method for selecting a cell to be camped on. The method includes selecting N cells waiting to be camped on from a candidate cell list, where N is an integer not less than 2, decoding a PBCH of each of the N cells waiting to be camped on, selecting, from at least one cell whose PBCH is successfully decoded, one cell as a cell continuing waiting to be camped on, decoding RMSI of the cell continuing waiting to be camped on, to obtain an RMSI decoding result, and when the RMSI decoding result indicates that the cell continuing waiting to be camped on meets a camping criterion, determining the cell continuing waiting to be camped on as the cell to be camped on.

In the method for selecting a cell to be camped, the cells waiting to be camped on are first selected from the candidate cell list, the PBCH of each selected cell waiting to be camped on is decoded, then one cell is selected from the cells whose PBCHs are successfully decoded, RMSI of the cell is decoded, and when the RMSI is successfully decoded, the cell is used as the cell to be camped on. Because the cell whose RMSI is decoded is selected after two selection processes, an RMSI decoding success probability is increased, thereby increasing a cell camping success rate, and an attempt to camp on a plurality of cells is avoided, thereby reducing a cell camping delay.

In a possible design, before the selecting N cells waiting to be camped on from a candidate cell list, the method further includes obtaining an initial cell list through initial receive beam sweeping, and obtaining the candidate cell list based on a barred cell list of a terminal and the initial cell list, and further, the selecting N cells waiting to be camped on from a candidate cell list includes selecting the N cells waiting to be camped on from the candidate cell list based on a signal strength metric of a cell.

A cell in the barred cell list of the terminal is screened out from the cell list obtained through initial receive beam sweeping. Further, the cell waiting to be camped on is selected based on signal strength of a cell, and a subsequent camping procedure is performed. In this way, a waste of time in a cell with a weak signal or barred from being camped on can be avoided, thereby reducing a cell camping delay and increasing a cell camping success rate.

In a possible design, the barred cell list of the terminal includes at least one of the following a cell that is barred from being camped on as indicated in a historical PBCH decoding result, or a cell that is not barred from being camped on as indicated in a historical PBCH decoding result but whose historical RMSI fails to be decoded.

In a possible design, the obtaining the candidate cell list based on a barred cell list of a terminal and the initial cell list includes, if any cell is in the initial cell list but is not in the barred cell list, determining that the any cell is in the candidate cell list.

In a possible design, the obtaining the candidate cell list based on a barred cell list of a terminal and the initial cell list includes, if any cell is in both the initial cell list and the barred cell list, but the any cell currently does not meet a barring condition, determining that the any cell is in the candidate cell list.

In a possible design, the selecting the N cells waiting to be camped on from the candidate cell list based on a signal strength metric of a cell includes calculating the signal strength metric of each cell in the candidate cell list, and selecting, as the N cells waiting to be camped on, cells whose signal strength metrics are ranked top N.

In a possible design, the selecting the N cells waiting to be camped on from the candidate cell list based on a signal strength metric of a cell includes calculating the signal strength metric of each cell in the candidate cell list, and selecting, as the cells waiting to be camped on, cells whose signal strength metrics are greater than a preset threshold for camping.

In a possible design, before the selecting N cells waiting to be camped on from a candidate cell list, the method further includes obtaining the candidate cell list through initial receive beam sweeping, and the selecting N cells waiting to be camped on from a candidate cell list includes selecting M cells pre-waiting to be camped on from the candidate cell list based on a signal strength metric of a cell, where M is not less than N, and selecting, based on the barred cell list of the terminal, the N cells waiting to be camped on from the M cells pre-waiting to be camped on.

In a possible design, the selecting, based on the barred cell list of the terminal, the N cells waiting to be camped on from the M cells pre-waiting to be camped on includes removing at least one cell in the barred cell list of the terminal from the M cells pre-waiting to be camped on, to obtain the N cells waiting to be camped on.

The barred cell list stored on the terminal is obtained based on historical prior information. If some cells are barred, for a plurality of times, from being camped on in a historical camping process, such cells may be added to the barred cell list, to avoid a waste of time in the barred cells.

In a possible design, the selecting, from at least one cell whose PBCH is successfully decoded, one cell as a cell continuing waiting to be camped on includes selecting, from the at least one cell whose PBCH is successfully decoded, at least one cell that is not barred from being camped on and that is indicated in the PBCH decoding result, and selecting, as the cell continuing waiting to be camped on, a cell with a largest signal strength metric from the at least one cell that is not barred from being camped on.

A cell that is not barred and that has a strongest signal is selected as the cell continuing waiting to be camped on, and RMSI of the cell is decoded. This avoids a waste of time in the barred cells, and an RMSI decoding success probability for the cell with the strongest signal is higher, thereby reducing a cell camping delay and increasing a cell camping success rate.

In a possible design, the method further includes, if decoding of the RMSI of the cell continuing waiting to be camped on fails for the first time, obtaining a cell list through initial receive beam sweeping, and continuing performing cell camping, and if decoding of the RMSI of the cell continuing waiting to be camped on fails more than once, determining that the cell camping fails.

In a possible design, the signal strength metric includes at least one of reference signal received power (RSRP), reference signal received quality (RSRQ), or a signal-to-interference-plus-noise ratio (SINR).

In a possible design, the PBCH decoding result includes at least one of a barred state of the cell or configuration information of the RMSI.

A second aspect of this application provides an apparatus for selecting a cell to be camped on. The apparatus includes a first selection module configured to select N cells waiting to be camped on from a candidate cell list, where N is an integer not less than 2, a first decoding module configured to decode a PBCH of each of the N cells waiting to be camped on, a second selection module configured to select, from at least one cell whose PBCH is successfully decoded, one cell as a cell continuing waiting to be camped on, a second decoding module configured to decode RMSI of the cell continuing waiting to be camped on, to obtain an RMSI decoding result, and a determining module configured to, when the RMSI decoding result indicates that the cell continuing waiting to be camped on meets a camping criterion, determine the cell continuing waiting to be camped on as the cell to be camped on.

In the apparatus for selecting a cell to be camped, the cells waiting to be camped on are first selected from the candidate cell list, the PBCH of each selected cell waiting to be camped on is decoded, then one cell is selected from the cells whose PBCHs are successfully decoded, RMSI of the cell is decoded, and when the RMSI is successfully decoded, cell camping is completed. Because the cell whose RMSI is decoded is selected after two selection processes, an RMSI decoding success probability is increased, thereby increasing a cell camping success rate, and an attempt to camp on a plurality of cells is avoided, thereby reducing a cell camping delay.

In a possible design, the apparatus further includes a first obtaining module configured to obtain an initial cell list through initial receive beam sweeping, and a second obtaining module configured to obtain the candidate cell list based on a barred cell list of the apparatus and the initial cell list, where the first selection module is further configured to select the N cells waiting to be camped on from the candidate cell list based on a signal strength metric of a cell.

In a possible design, the barred cell list of the apparatus includes at least one of the following a cell that is barred from being camped on as indicated in a historical PBCH decoding result, or a cell that is not barred from being camped on as indicated in a historical PBCH decoding result but whose historical RMSI fails to be decoded.

The barred cell list stored on the apparatus is obtained based on historical prior information. If some cells are barred, for a plurality of times, from being camped on in a historical camping process, such cells may be added to the barred cell list, to avoid a waste of time in the barred cells.

In a possible design, the second obtaining module is further configured to, if any cell is in the initial cell list but is not in the barred cell list, determine that the any cell is in the candidate cell list.

In a possible design, the second obtaining module is further configured to, if any cell is in both the initial cell list and the barred cell list, but the any cell currently does not meet a barring condition, determine that the any cell is in the candidate cell list.

In a possible design, the first selection module is further configured to calculate the signal strength metric of each cell in the candidate cell list, and select, as the N cells waiting to be camped on, cells whose signal strength metrics are ranked top N.

In a possible design, the apparatus further includes an obtaining module, where the obtaining module is configured to obtain the candidate cell list through initial receive beam sweeping, and the first selection module is further configured to select M cells pre-waiting to be camped on from the candidate cell list based on a signal strength metric of a cell, where M is not less than N, and select, based on the barred cell list of the apparatus, the N cells waiting to be camped on from the M cells pre-waiting to be camped on.

In a possible design, the second selection module is further configured to select, from the at least one cell whose PBCH is successfully decoded, at least one cell that is not barred from being camped on and that is indicated in the PBCH decoding result, and select, as the cell continuing waiting to be camped on, a cell with a largest signal strength metric from the at least one cell that is not barred from being camped on.

A cell that is not barred and that has a strongest signal is selected as the cell continuing waiting to be camped on, and RMSI of the cell is decoded. This avoids a waste of time in the barred cells, and an RMSI decoding success probability for the cell with the strongest signal is higher, thereby reducing a cell camping delay and increasing a cell camping success rate.

In a possible design, the signal strength metric includes at least one of RSRP, RSRQ, or a SINR.

A third aspect of this application provides an apparatus for selecting a cell to be camped on. The apparatus includes a processor, where the processor is configured to read a software instruction stored in a memory, and execute the software instruction to implement the following operations selecting N cells waiting to be camped on from a candidate cell list, where N is an integer not less than 2, decoding a PBCH of each of the N cells waiting to be camped on, selecting, from at least one cell whose PBCH is successfully decoded, one cell as a cell continuing waiting to be camped on, decoding RMSI of the cell continuing waiting to be camped on, to obtain an RMSI decoding result, and when the RMSI decoding result indicates that the cell continuing waiting to be camped on meets a camping criterion, determining the cell continuing waiting to be camped on as the cell to be camped on.

In a possible design, the apparatus further includes a memory, where the memory is configured to store a program instruction, and the program instruction is used to drive the processor to perform the foregoing operations.

In a possible design, the memory includes at least one of a computer-readable storage medium, a floppy disk device, a hard disk device, an optical disc device, or a magnetic disk device.

In a possible design, the processor is further configured to perform the method according to any one of the first aspect or the possible designs of the first aspect.

A fourth aspect of this application provides a computer-readable storage medium. The computer-readable storage medium stores an instruction, and when the instruction is run on a computer or a processor, the computer or the processor is enabled to perform the method according to any one of the first aspect or the possible designs of the first aspect.

A fifth aspect of this application provides a computer program product including an instruction. When the computer program product runs on a computer or a processor, the computer or the processor is enabled to perform the method according to any one of the first aspect or the possible designs of the first aspect.

DESCRIPTION OF EMBODIMENTS

In the embodiments, claims, and the accompanying drawings of this specification in this application, the terms "first", "second", and the like are intended to distinguish similar objects, but do not necessarily indicate a specific order or sequence. In addition, the terms "include", "have", and any variant thereof are intended to cover a non-exclusive inclusion, for example, include a series of steps or units. Methods, systems, products, or devices are not necessarily limited to those steps or units that are clearly listed, but may include other steps or units that are not clearly listed or inherent to such processes, methods, products, or devices.

It should be understood that in this application, "at least one" refers to one or more, and "a plurality of" refers to two or more. The term "and/or" is used to describe an association relationship between associated objects, and indicates that three relationships may exist. For example, "A and/or B" may indicate the following three cases. Only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may indicate a, b, c, "a and b", "a and c", "b and c", or "a, b, and c", where a, b, and c may be singular or plural.

Figure 1:
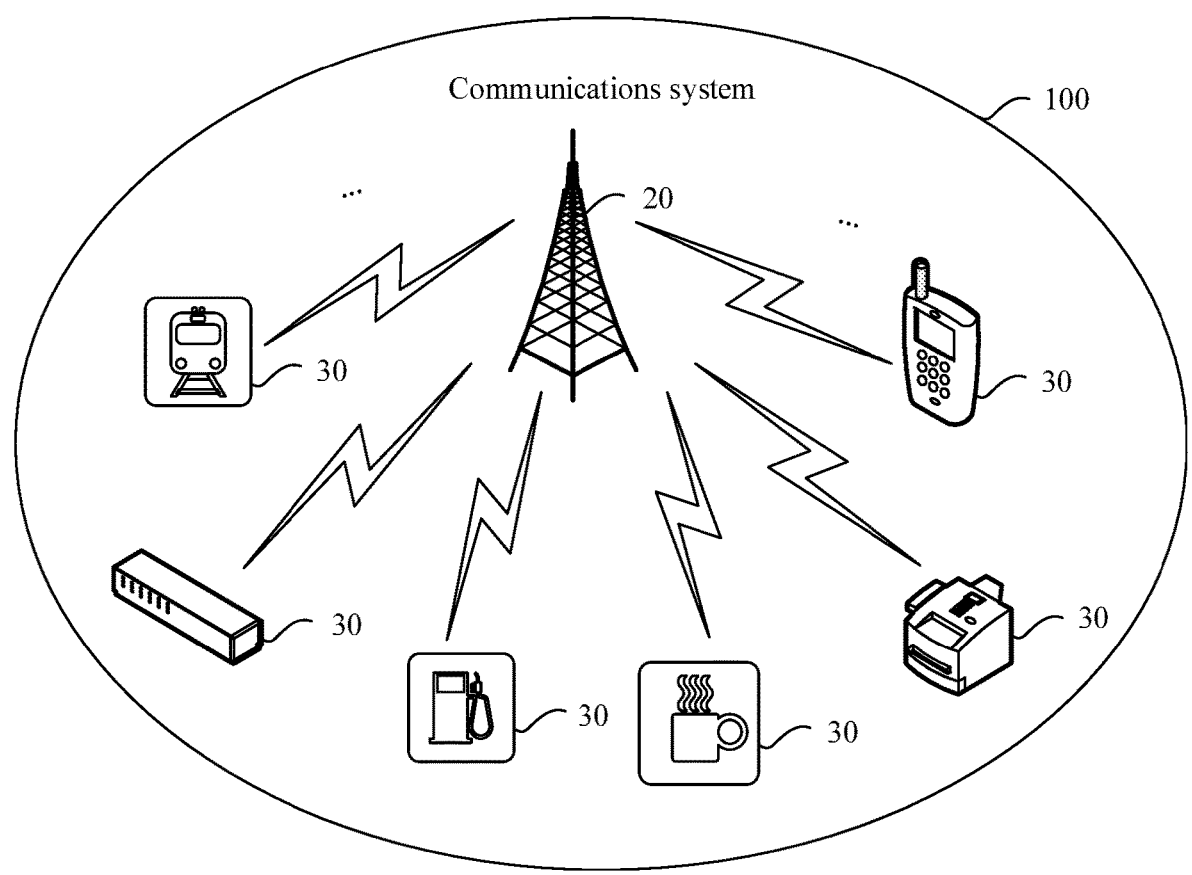
FIG. 1 is a schematic architectural diagram of a communications system according to an embodiment of this application.

FIG. 1 shows an example of a communications system 100 according to an embodiment of this application. The communications system 100 includes one access network device 20 and one or more terminals 30 connected to the access network device 20.

The access network device 20 is a wireless network node, and can provide the terminal 30 with various wireless communications services such as a voice call, a video, data, message sending and receiving, and broadcast. Because mobile communication is also referred to as cellular communication, the access network device 20 may form one or more cells, and serve a plurality of terminals 30 in the one or more cells. For example, the access network device 20 may be a base station, a relay station, or another radio access point. The base station supports various wireless communications protocols, for example, may be a base transceiver station (BTS) in a Global System for Mobile Communications (GSM) or a code division multiple access (CDMA) network, or may be a NodeB (NB) in a wideband code division multiple access (WCDMA), or may be an evolved NodeB (eNB) in Long Term Evolution (LTE), or may be an eNB in the Internet of things (IoT) or Narrowband IoT (NB-IoT). Optionally, the access network device 20 may alternatively be a new radio NodeB (gNB) in a future 5G mobile communications network. Each gNB has a plurality of transmission reception points (TRP), and the access network device 20 may alternatively be the transmission reception point TRP. Alternatively, the access network device may be a network device in a future evolved public land mobile network (PLMN).

The terminal 30 is also referred to as UE, and may be specifically an access terminal, a terminal unit, a terminal station, a mobile station, a mobile console, a remote station, a remote terminal, a mobile device, a wireless communications device, a terminal agent, a terminal apparatus, or the like. The access terminal may include various types of products such as a handheld device, a vehicle-mounted device, and a wearable device that have wireless communication functions, for example, a cellular phone, a cordless phone, a Session Initiation Protocol (SIP) phone, a wireless local loop (WLL) station, a personal digital assistant (PDA), a Global Positioning System (GPS), a camera, and an audio player, a terminal in a future 5G network, a terminal in a future evolved PLMN network, or the like. For example, a common form of the terminal 30 is an intelligent terminal, including a mobile phone, a tablet computer, or a wearable device. This is not specifically limited in this embodiment of this application. The terminal 30 may support at least one of the foregoing various wireless communication protocols supported by the access network device 20, to communicate with the access network device 20.

Figure 2:
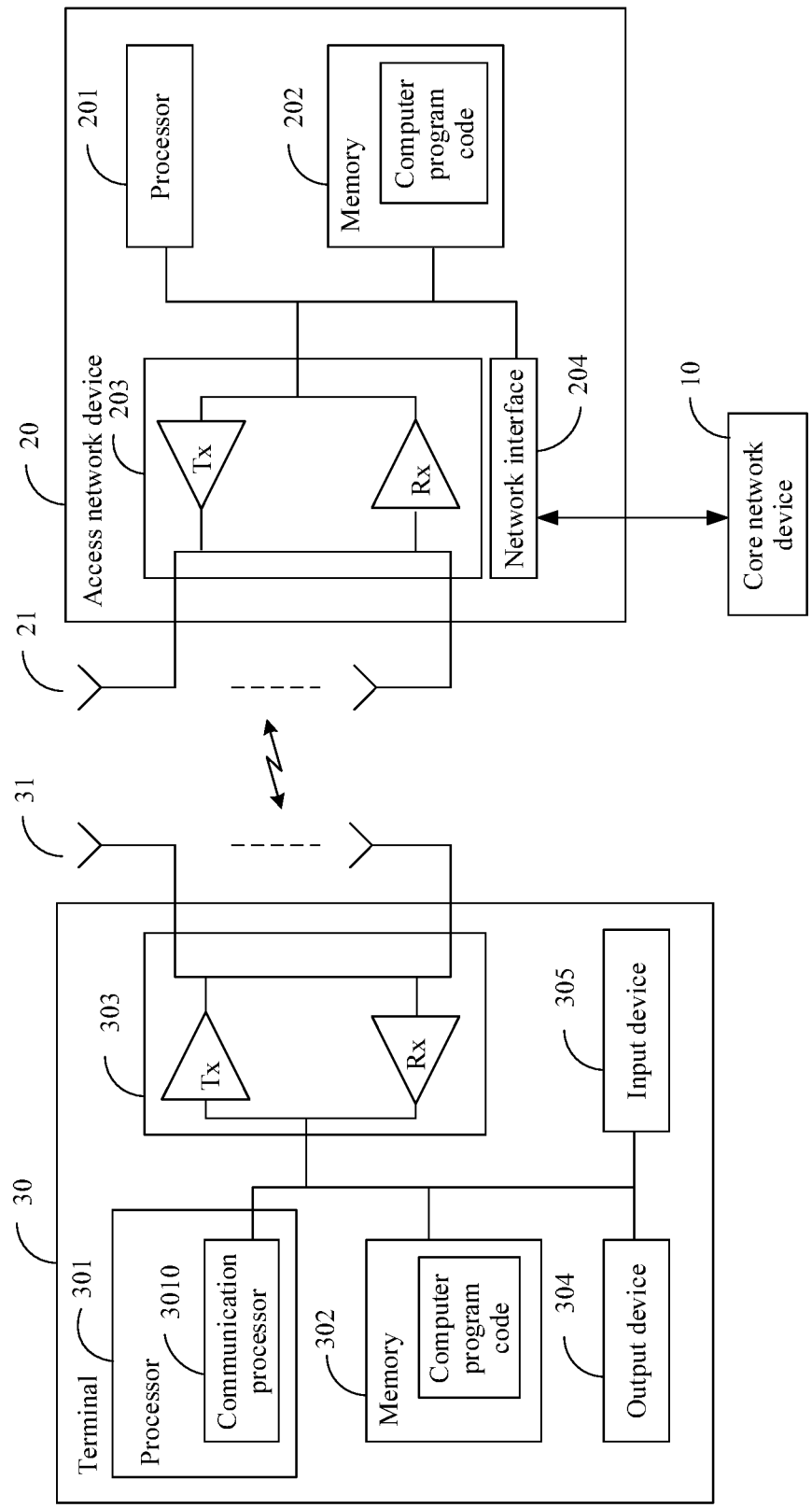
FIG. 2 is a schematic diagram of a hardware structure of an access network device 20 and a terminal 30 in communication according to an embodiment of this application.

FIG. 2 is a schematic diagram of a hardware structure of an access network device 20 and a terminal 30 according to an embodiment of this application. The terminal 30 includes at least one processor 301, at least one memory 302, and at least one transceiver 303. Optionally, the terminal 30 may further include one or more antennas 31, an output device 304, and an input device 305.

The processor 301, the memory 302, and the transceiver 303 are coupled to each other through a connector. The connector may include various types of interfaces, transmission lines, or buses. This is not limited in this embodiment. The memory 302 may exist independently, and is coupled to the processor 301 through a connector. Optionally, the memory 302 may alternatively be integrated with the processor 301. It should be noted that in the embodiments of this application, coupling refers to an interrelationship in a particular manner, and includes direct connection or indirect connection through another device.

The processor 301 may be configured to control a radio frequency circuit (which is not shown in the figure, and may be included in the transceiver 303 to implement radio frequency processing) to receive and send a signal through one or more antennas 31. The processor 301 is further configured to process the foregoing signal. For example, decoding, modulation, or various other known signal processing processes and a new future possible signal processing process may be performed on the received signal. For example, the processor 301 may be configured to implement some or all operations in the embodiments of this application, for example, may be configured to implement PBCH decoding, RMSI decoding, receive beam sweeping, and the like. For example, as shown in FIG. 2, the processor 301 may include a communications processor 3010. Optionally, the processor 301 may include at least one of the following types a general-purpose central processing unit (CPU), a digital signal processor (DSP), a microprocessor, a microcontroller unit (MCU), or a microprocessor. For example, the processor 301 may be a single-core (single-CPU) processor or a multi-core (multi-CPU) processor. The processor 301 may be a processor group including a plurality of processors, and the plurality of processors are coupled to each other through one or more buses. The processor may include an analog-to-digital converter (ADC) and a digital-to-analog converter (DAC), to implement a signal connection between different components of the apparatus. Optionally, a plurality of processors or units included in the processor 301 may be integrated into one chip or located on a plurality of different chips.

In this embodiment of this application, the chip is a system manufactured on a same semiconductor substrate using an integrated circuit process, and is referred to as a semiconductor chip. The chip may be a set of integrated circuits manufactured on the substrate (which is usually made of a semiconductor material such as silicon) using the integrated circuit process, and an outer layer of the chip is usually packaged with a semiconductor packaging material. The integrated circuit may include various types of functional components. Each type of functional component includes a logic gate circuit, a metal-oxide-semiconductor (MOS) transistor, or a transistor such as a bipolar transistor or a diode, and may also include another component such as a capacitor, a resistor, or an inductor. Each functional device may work independently or work after being driven by necessary software, and may implement various functions such as communication, operation, or storage.

The memory 302 may be configured to store a computer program instruction, including a computer operating system (OS), various user application programs, and various types of computer program code including program code that is used to execute the solutions of this application. The memory 302 may be further configured to store user data, for example, calendar information and contact information. Optionally, the memory 302 may be further configured to store a barred cell list, a cell list obtained through initial receive beam sweeping, and the like. The memory 302 may be further configured to store some or all preset parameter information, for example, a preset quantity of cells waiting to be camped on that are selected by a terminal, and a determining threshold for cell camping. The processor 301 may execute computer program code stored in the memory 302, and various types of to-be-executed computer program code may also be considered as a driver of the processor 301. For example, the processor 301 may be configured to execute the computer program code stored in the memory 302, to implement a method in the subsequent embodiments of this application. An amount of the computer program code is quite large, and the computer program code may form a computer-executable instruction that can be executed by at least one of the processors 301, to drive a related processor to perform various types of processing, for example, a communication signal processing algorithm supporting the foregoing various wireless communication protocols, OS running, or application running. Optionally, the processor 301 may implement a related processing function based on preset parameter information stored in the memory 302. Optionally, the memory 302 may be a nonvolatile memory, for example, an embedded MultiMediaCard (eMMC), a Universal Flash Storage (UFS), or a read-only memory (ROM), or may be another type of static storage device that can store static information and an instruction, or may be a volatile memory, for example, a random access memory (RAM), or another type of dynamic storage device that can store information and an instruction, or may be an electrically erasable programmable read-only memory (EEPROM), a compact disc read-only memory (CD-ROM), or another compact disc storage, an optical disc storage (including a compressed optical disc, a laser disc, an optical disc, a digital versatile optical disc, a BLU-RAY optical disc, or the like), a magnetic disk storage medium or another magnetic storage device, or any other computer-readable storage medium that can be configured to carry or store program code in a form of an instruction or a data structure and can be accessed by a computer, but is not limited thereto.

The transceiver 303 may be any apparatus configured to implement receiving and sending of a communication signal, may include a radio frequency circuit, and may be coupled to the antenna 31. The transceiver 303 includes a transmitter (Tx) and a receiver (Rx). Optionally, the transceiver 303 is driven by the processor 301 to implement signal receiving and sending. Specifically, the one or more antennas 31 may be configured to receive a radio frequency signal. The Rx of the transceiver 303 is configured to receive the radio frequency signal from the antenna, convert the radio frequency signal into a digital baseband signal or a digital intermediate frequency signal, and provide the digital baseband signal or the digital intermediate frequency signal to the communications processor 3010 included in the processor 301 such that the communications processor 3010 performs further processing, such as demodulation processing and decoding processing, on the digital baseband signal or the digital intermediate frequency signal. In addition, the Tx of the transceiver 303 is further configured to receive a modulated digital baseband signal or digital intermediate frequency signal from the communications processor 3010, convert the modulated digital baseband signal or digital intermediate frequency signal into a radio frequency signal, and send the radio frequency signal through the one or more antennas 31. Specifically, the Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The Tx may selectively perform one or more levels of frequency up-mixing processing and digital-to-analog conversion processing on the modulated digital baseband signal or digital intermediate frequency signal, to obtain the radio frequency signal. A sequence of the frequency up-mixing processing and the digital-to-analog conversion processing may be adjustable. The digital baseband signal and the digital intermediate frequency signal may be collectively referred to as a digital signal.

The output device 304 communicates with the processor 301, and may display information in various manners. For example, the output device 304 may be a liquid-crystal display (LCD), a light-emitting diode (LED) display device, a cathode-ray tube (CRT) display device, a projector, or the like. The input device 305 communicates with the processor 301, and may receive an input of a user in various manners. For example, the input device 305 may be a mouse, a keyboard, a touchscreen device, a sensing device, or the like.

The antenna 31 may be an antenna array having a plurality of antenna elements. The plurality of antenna elements use a plurality of groups of beam forming weights to form a plurality of beams. Specifically, when the terminal 30 is a 5G terminal, the antenna 31 is a large-scale antenna array, and generates a plurality of receive beams and a plurality of transmit beams.

The access network device 20 includes at least one processor 201, at least one memory 202, at least one transceiver 203, one or more antennas 21, and at least one network interface 204. Specifically, the antenna 21 may be an antenna array having a plurality of antenna elements. The processor 201, the memory 202, the transceiver 203, and the network interface 204 are coupled to each other through a connector. The network interface 204 is configured to be coupled to a core network device 10 via a communication link such as an S1 interface. Alternatively, the network interface 204 is connected to a network interface of another access network device via a wired or wireless link such as an external (X2) interface. A connection manner is not shown in the figure, and a specific connection manner is not specifically limited in this embodiment of this application. In addition, for related descriptions of the antenna 21, the processor 201, the memory 202, and the transceiver 203, refer to descriptions of the antenna 31, the processor 301, the memory 302, and the transceiver 303 in the terminal 30, to implement similar functions. For example, the processor 201 may include a communications processor configured to perform polar coding on information or data that needs to be sent to the terminal 30, to obtain a coded sequence, and modulate the coded sequence to generate modulated data, to transmit the modulated data to an antenna through the Tx in the transceiver 303.

Based on the foregoing descriptions, this embodiment of this application may be further extended to more communications application scenarios. This is not limited in this embodiment. Although a mobile communications scenario is mainly used as an example for description in subsequent embodiments, it may be understood that a communications device used by a user in any communications scenario may be considered as UE, and a peer device that communicates with a device held by a user may be considered as an access network device. Therefore, the foregoing communication application scenario is merely for ease of description, but is not intended to strictly limit this embodiment.

Further, for ease of description, in subsequent descriptions, a base station mentioned in the embodiments of this application is used as an example of the access network device 20, and the base station may be replaced with any other example of the access network device 20. In addition, a network end mentioned in the embodiments of this application may include the access network device 20, or may optionally further include a core network device.

For example, in a 5G communications technology, because signal attenuation is severe in a high-frequency scenario, an antenna array is configured for both a 5G base station and a 5G terminal. In addition, to resist path attenuation and effectively enhance signal coverage, the base station usually uses a plurality of narrow beams with different directions. Correspondingly, there are also a plurality of narrow beams with different directions on a terminal side. This means that in a 5G communications system, to implement efficient communication between a base station and a terminal, an appropriate beam needs to be selected from a plurality of beams.

Figure 3:
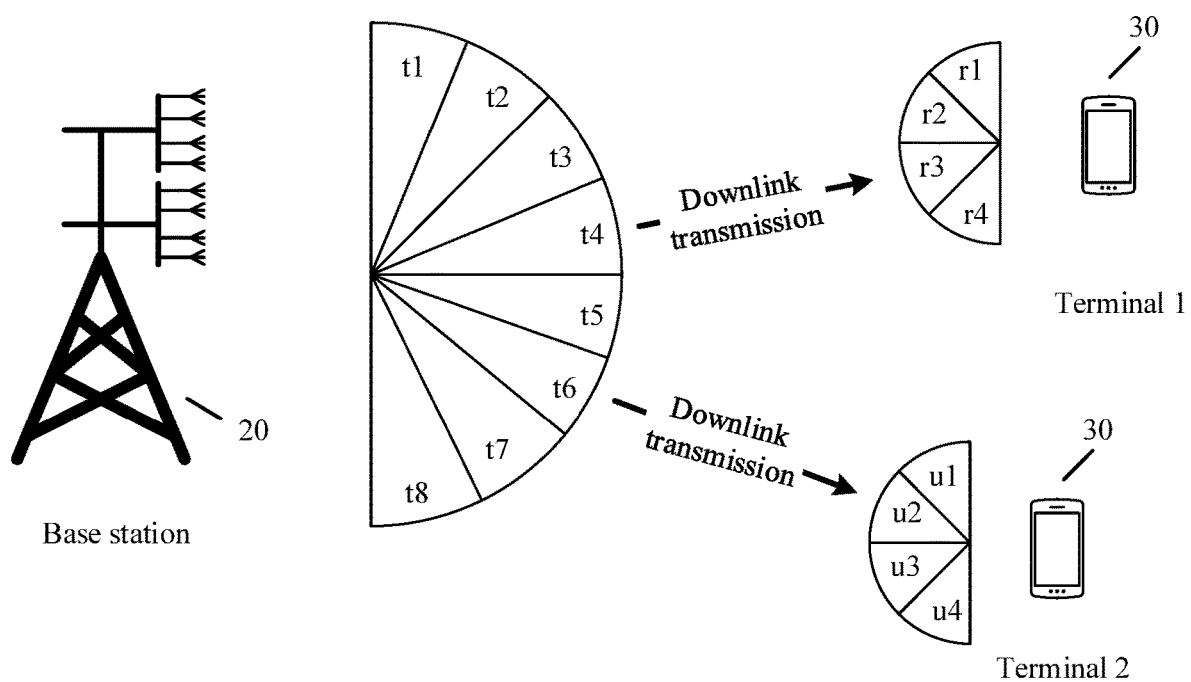
FIG. 3 is a schematic diagram of multi-beam communication between a base station and a terminal according to an embodiment of this application.

FIG. 3 is a schematic diagram of multi-beam communication according to an embodiment of this application. For details about a base station, refer to the access network device 20. For details about a terminal 1 and a terminal 2, refer to the terminal 30. Specifically, in FIG. 3, a base station 20 is a 5G base station, a terminal 30 is a 5G terminal, and the base station 20 and the terminal 30 transmit data to each other on a high-band resource using a beam. For example, when downlink transmission needs to be performed, the base station 20 may transmit related system information, a cell resource, and to-be-transmitted downlink data on all of a plurality of downlink transmit beams. Correspondingly, the terminal 30 sweeps a plurality of receive beams, to select an appropriate receive beam to receive the system information, the cell resource, the downlink data, and the like that are sent by the base station, to implement processes such as cell search, cell synchronization, and cell camping. Correspondingly, when uplink transmission needs to be performed, the terminal needs to select an appropriate uplink transmit beam to send uplink data, and the base station needs to select a corresponding uplink receive beam to receive the uplink data sent by the terminal. It should be understood that the downlink transmission described in this embodiment of this application is transmission from the base station to the terminal, including but not limited to data and control signaling transmission, and the uplink transmission is transmission from the terminal to the base station, including but not limited to data and control signaling transmission. FIG. 3 shows a multi-beam communication process using downlink transmission as an example. As shown in FIG. 3, the base station uses eight beams in total t1 to t8. In a downlink transmission process, the base station sequentially transmits radio signals using beams with different directions. Therefore, the base station needs to perform downlink transmit beam sweeping to select an optimal transmit beam pointing to a terminal. Correspondingly, the terminal also uses a plurality of beams with different directions. As shown in FIG. 3, the terminal 1 uses four beams r1 to r4, and the terminal 2 uses four beams u1 to u4. The two terminals each need to perform downlink receive beam sweeping to select an optimal downlink receive beam. In FIG. 3, optimal downlink transmit-receive beam pairs corresponding to the terminal 1 and the terminal 2 are respectively (t4, r3) and (t6, u2). It should be understood that quantities of beams on a base station side and a terminal side are merely examples provided in this embodiment of this application, and there may be various actual quantities of beams. Similarly, quantities of base stations and terminals do not constitute any limitation to the technical solutions provided in this application.

When the terminal needs to camp on a cell, the terminal performs initial receive beam sweeping near a frequency to obtain cell resources around the frequency. Generally, the terminal does not perform cell camping determining on all obtained cells, but selects a preset quantity of cells waiting to be camped on from the obtained cell resources, and the preset quantity is stored on the terminal. For example, the selected cells waiting to be camped on are first several cells with strongest signals in the cell resources.

Figure 4:
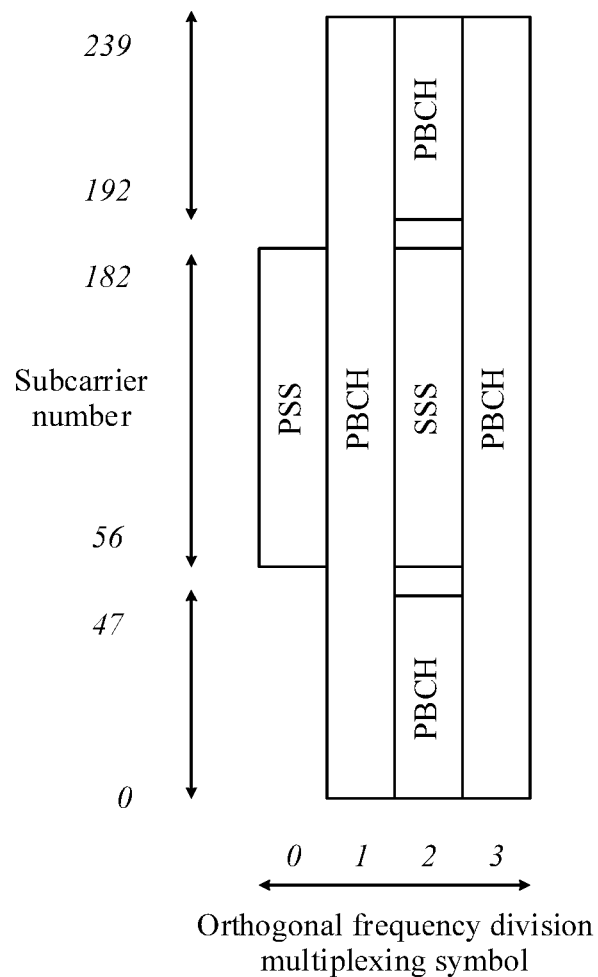
FIG. 4 is a schematic diagram of a time-frequency structure of a synchronization signal block (SSB) according to an embodiment of this application.

To describe a cell camping procedure, a time-frequency structure of an SSB needs to be first described. FIG. 4 is a schematic diagram of a time-frequency structure of an SSB according to an embodiment of this application.

As shown in FIG. 4, in a new radio (NR) system, each SSB includes four symbols adjacent in time domain. The four symbols are respectively a primary synchronization signal (PSS), a PBCH, a secondary synchronization signal (SSS), and a PBCH, occupy four orthogonal frequency division multiplexing (OFDM) symbols in total, and are numbered from 0 to 3 in ascending order. The PSS occupies an OFDM symbol 0, the SSS occupies an OFDM symbol 2, the PBCHs occupy OFDM symbols 1 and 3, and there is a part of the PBCH in the OFDM symbol 2. In frequency domain, the SSB is mapped to corresponding subcarriers based on resource elements (REs) in ascending order. The SSB continuously occupies 240 REs contiguous in frequency domain (the 240 REs correspond to subcarrier numbers 0 to 239 in FIG. 4). On the OFDM symbol 0, in 240 REs, no data is placed on an RE other than an RE occupied by the PSS. On the OFDM symbol 2, eight REs and nine REs are separately empty at a boundary of the SSS and the PBCH, and no data is placed in the eight REs and the nine REs. For example, a 1-bit flag bit in a PBCH payload in NR is used to indicate whether a corresponding cell is barred from being camped on. It should be understood that the time-frequency structure of the SSB shown in FIG. 4 is merely an example, and the SSB may alternatively have a frame structure in another form. This is not limited in this embodiment of this application.

The base station periodically sends a plurality of SSBs. In this period, for different SSBs, the base station may send the SSBs in different transmit beam directions, and a same SSB in periods corresponds to a same transmit beam direction. UE receives the SSB on each receive beam for cell search. A cell search process is a process in which the UE obtains a physical cell identifier (PCI) and completes downlink synchronization, in other words, the UE and a cell are synchronized in time and frequency. To perform cell search, the UE needs to receive the following synchronization signals: a PSS and an SSS. After receiving the PSS and the SSS, the UE can obtain a PCI through decoding, to complete downlink synchronization. The UE decodes a PBCH of a cell to obtain a master information block (MIB). The MIB includes some most important system parameters in a system and some prerequisite parameter information that is required for continuing to obtain a system message. For example, the MIB may include a barred state of the cell, a system frame number, configuration information of RMSI, and the like. After the PBCH is successfully decoded, the UE decodes RMSI of the cell to obtain a system information block (SIB), for example, including a SIB 1. For example, a SIB 1 message may be roughly classified into cell access related information, cell selection information, and cell bandwidth information. For example, a time for decoding the PBCH of the cell is about 150 milliseconds, and a time for decoding the RMSI of the cell is approximately in seconds. If a PBCH of a cell is successfully decoded but decoding of RMSI fails, the cell is to be replaced, and a camping procedure continues to be attempted.

After successfully performing synchronization, the UE reads the MIB and the SIB and determines, by parsing the SIB 1, whether a current cell is suitable for being camped on. In a cell selection process, the terminal needs to measure a to-be-selected cell, to perform channel quality evaluation and determine whether the to-be-selected cell meets a camping criterion. Optionally, the camping criterion for cell selection may be an S criterion, and the S criterion includes evaluation on cell signal power and evaluation on a cell service level. For a specific formula of the S criterion, refer to other approaches. Details are not described herein. After channel quality of a cell meets the S criterion, the cell may be selected as a cell to be camped on. It should be understood that, in addition to the S criterion, there may be another determining criterion for selecting a cell to be camped on, provided that signal strength (including signal quality, signal power, and the like) and a service level of the selected cell meet a communication requirement.

PBCHs and RMSI of cells obtained in an initial receive beam sweeping process are sequentially decoded, in an embodiment, a PBCH and RMSI of the first cell are first decoded, and then, whether a PBCH and RMSI of the second cell are decoded is determined based on a decoding result. When a signal fluctuation in a cell results in successful decoding of a PBCH of a cell that first attempts to be camped on, but failing in decoding RMSI, the terminal wastes time in the cell whose RMSI fails to be decoded. As a result, a cell camping delay is increased. In addition, in this case, there are many occasional unfavorable factors, and a cell camping success rate is not high. Therefore, selecting an appropriate cell to be camped on for camping is crucial to reducing the cell camping delay and increasing the cell camping success rate.

Figure 5:
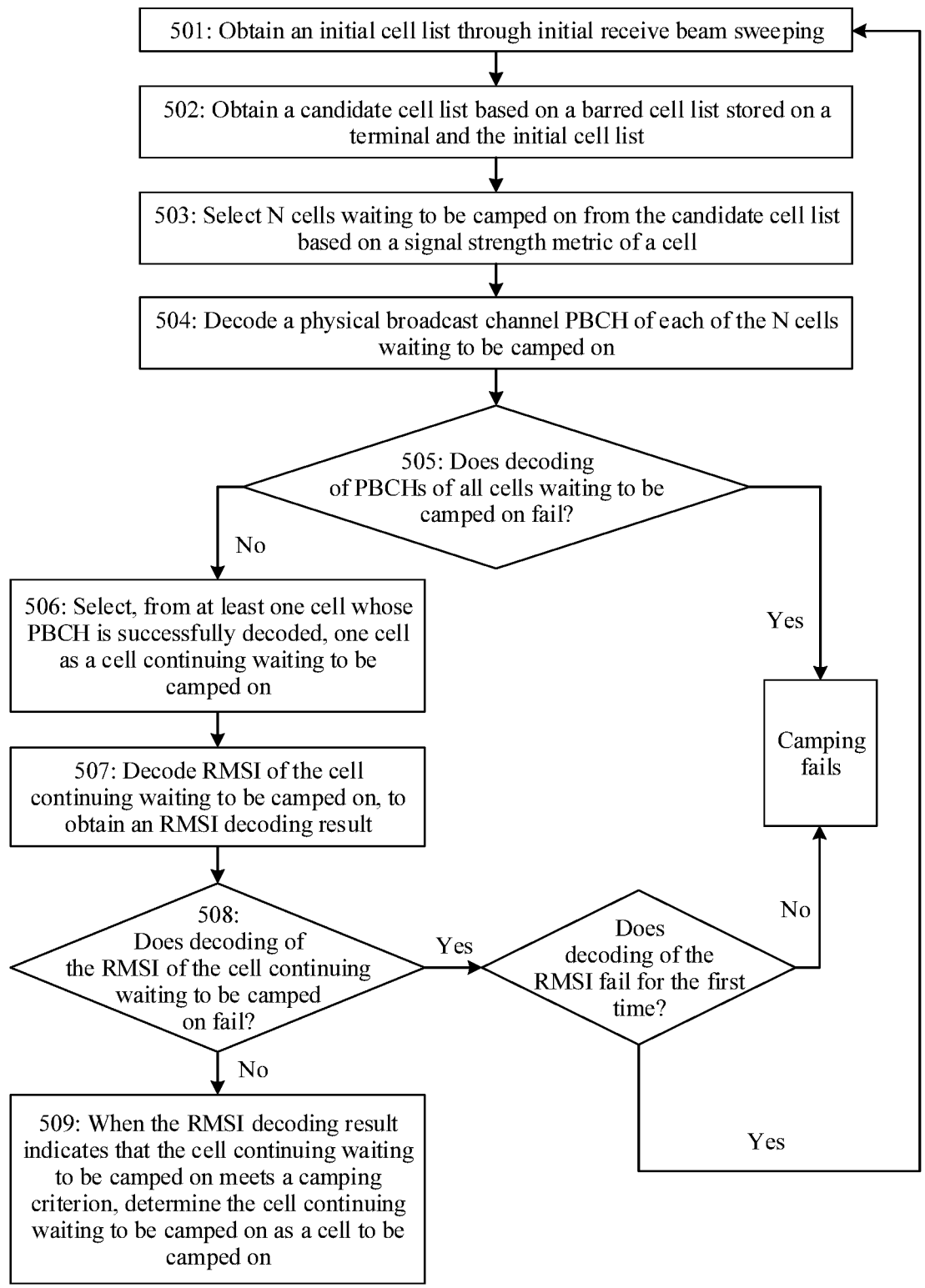
FIG. 5 is a schematic flowchart of a method for selecting a cell to be camped on according to an embodiment of this application.

FIG. 5 is a schematic flowchart of a method for selecting a cell to be camped on according to an embodiment of this application. For ease of understanding, the method for selecting a cell to be camped is described in a form of steps in this embodiment of this application. Although a sequence of the method is shown in the method flowchart 5, in some cases, the described steps may be performed in a sequence different from that described herein.

Optionally, the method for selecting a cell to be camped on includes step 501, which is to obtain an initial cell list through initial receive beam sweeping.

Specifically, a terminal performs initial receive beam sweeping near a frequency, to obtain all cells that can be found near the frequency. All these cells that can be found constitute the initial cell list. It should be understood that the initial cell list is a set of all cells that can be found. A meaning of the list mentioned in this embodiment of this application is the same as a meaning of a "set" in mathematics. Optionally, the frequency may be obtained by the terminal based on frequency measurement, or may be obtained based on prior information. A method for obtaining a frequency for receive beam sweeping is not limited in this embodiment of this application.

For example, UE receives an SSB on each receive beam, to perform cell search, obtains a PCI based on the cell search, and completes downlink synchronization. For example, the initial cell list may include a PCI obtained through search.

Optionally, the method for selecting a cell to be camped on includes step 502, which is to obtain a candidate cell list based on a barred cell list of the terminal and the initial cell list.

The initial cell list obtained by the terminal through initial receive beam sweeping may include a barred cell. The barred cell in the initial cell list is removed, and then a subsequent cell camping process is performed. This can avoid a waste of time in the barred cell, and reduce a cell camping delay. For example, the terminal usually stores a barred cell list, and the barred cell list includes a barred cell. Optionally, the barred cell may be determined based on prior information. For example, the terminal previously identifies some barred cells in a process of camping on a cell near the frequency, and then the barred cells are added to the barred cell list of the terminal. Optionally, a reason why a cell in the barred cell list is barred may include a historical PBCH load of the cell indicates that the cell is barred from being camped on, or a historical PBCH load of the cell indicates that the cell is not barred from being camped on but decoding of historical RMSI of the cell fails. It should be understood that, an RMSI decoding failure means that decoding fails, in other words, no proper decoding result is obtained. Alternatively, a historical RMSI decoding result of the cell indicates that the cell does not meet a camping criterion. Optionally, a network side notifies the terminal of a cell whose PBCH load indicates that the cell is barred, and the cell cannot be changed in the barred cell list. However, a cell that is added to the barred cell list due to an RMSI decoding failure can be updated, because decoding of the RMSI of the cell may fail due to a signal fluctuation. After the fluctuation is eliminated for a period of time, the decoding may succeed, or after a period of time, a signal of the cell whose RMSI fails to be decoded becomes better, and then the RMSI may be successfully decoded. Optionally, a cell in the barred cell list may be unconditionally barred from being camped on, in other words, the cell is always barred from being camped on. Optionally, a cell in the barred cell list is barred from being camped on when meeting a condition. For example, a cell is located in the barred cell list, and when a signal strength metric of the cell is less than a preset threshold, the cell is barred from being camped on. However, when the signal strength metric of the cell is greater than the preset threshold, the cell is not barred from being camped on. Optionally, the preset threshold may be preset by the terminal.

For example, the obtaining a candidate cell list based on a barred cell list of the terminal and the initial cell list includes determining whether a cell in the initial cell list is in the barred cell list of the terminal, and if a cell is in the initial cell list but is not in the barred cell list, adding the cell to the candidate cell list. Optionally, if a cell in the initial cell list is in the barred cell list, but the cell currently does not meet a barring condition, for example, a current signal strength metric of the cell is greater than a preset threshold, although the cell is in the barred cell list, the cell is not barred from being camped on, and then the cell is also added to the candidate cell list. In an optional case, the terminal presets a threshold. If a current signal strength metric of a cell in the barred cell list is greater than a sum of a metric when the cell is barred and the threshold preset by the terminal, it may be considered that the cell does not meet the barring condition in this case. Further, the cell may be added to the candidate cell list.

The method for selecting a cell to be camped on includes step 503, which is to select N cells waiting to be camped on from the candidate cell list based on a signal strength metric of a cell.

The candidate cell list is obtained by removing a cell that is in the barred cell list and that is in the initial cell list obtained through initial receive beam sweeping. Optionally, in the method for selecting a cell to be camped provided in this embodiment of this application, the terminal does not perform cell camping determining on all cells in the candidate cell list, but selects several cells as cells waiting to be camped on and attempts to camp on the cells. Generally, the terminal stores some preset parameters. For example, the preset parameters may include a quantity of cells waiting to be camped on that the terminal recommends selecting. It should be understood that N is a quantity of actually selected cells waiting to be camped on. When the quantity of actually selected cells waiting to be camped on is N, a preset parameter stored on the terminal may be used. Optionally, the quantity of selected cells waiting to be camped on may alternatively be less than the preset parameter. For example, if a preset quantity set by the terminal is Num, the quantity N of actually selected cells waiting to be camped on cannot exceed Num.

For example, before the cells waiting to be camped on are selected, a signal strength metric of each cell in the candidate cell list is calculated. Optionally, the signal strength metric includes at least one of RSRP, RSRQ, or a SINR. Optionally, the signal strength metric may be another variable indicating signal quality or power. This is not limited in this embodiment of this application. Optionally, the cells in the candidate cell list may be sorted based on a signal strength metric, and then cells whose signal strength ranks top N are selected as the cells waiting to be camped on. Optionally, the sorting herein may be sorting in descending order, or may be sorting in ascending order. A specific sorting method is not limited in this embodiment of this application provided that the cells whose signal strength ranks top N can be selected as the cells waiting to be camped on. Optionally, a threshold may be set. When a cell in the candidate cell list is greater than the threshold, the corresponding cell is selected as a cell waiting to be camped on.

The method for selecting a cell to be camped on includes step 504, which is to decode a PBCH of each of the N cells waiting to be camped on.

The PBCH of the cell may be decoded, to obtain a MIB, to learn a specific configuration of the cell, and an SFN, configuration information of RMSI, and the like may be learned based on the received MIB. Optionally, the PBCH may be decoded, to learn a barred state of the cell. For example, a 1-bit flag bit in a PBCH load of the cell is used to indicate whether the corresponding cell is barred from being camped on.

Optionally, the method for selecting a cell to be camped on includes step 505, which is to judge whether decoding of PBCHs of all cells waiting to be camped on fails.

In an optional case, if decoding of the PBCHs of all the cells waiting to be camped on fails, a cell suitable for being camped on is not found in this initial receive beam sweeping process, and cell camping fails. If decoding of the PBCHs of not all the cells waiting to be camped on fails, step 506 is performed.

The method for selecting a cell to be camped on includes step 506, which is to select, from at least one cell whose PBCH is successfully decoded, one cell as a cell continuing waiting to be camped on.

If decoding of a PBCH of a cell fails, an attempt to camping on the cell is not considered. Therefore, the cell continuing waiting to be camped on is selected from the cell whose PBCH is successfully decoded. It should be understood that the cell continuing waiting to be camped on is a cell in which a subsequent camping process continues, that is, a cell in which RMSI is subsequently decoded after the PBCH is decoded. For example, the selecting, from at least one cell whose PBCH is successfully decoded, one cell as a cell continuing waiting to be camped on includes selecting, based on a decoding result of the PBCH, from the at least one cell whose PBCH is successfully decoded, a cell that is not barred from being camped on. As mentioned in the foregoing embodiment, the PBCH load has a 1-bit flag bit used to indicate whether the corresponding cell is barred from being camped on. For example, the cell that is not barred from being camped on and that is indicated in the PBCH load is selected from the at least one cell whose PBCH is successfully decoded.

For example, the selecting, from at least one cell whose PBCH is successfully decoded, one cell as a cell continuing waiting to be camped on further includes selecting, as the cell continuing waiting to be camped on, a cell with a largest signal strength metric from the selected at least one cell that is not barred from being camped on. For example, the cell with the largest signal strength metric may be a cell with largest RSRP, or a cell with best RSRQ, or a cell with a largest SINR. Selecting the cell with the largest signal strength metric as the cell continuing waiting to be camped on and continuing the subsequent cell camping process can increase a cell camping success rate, avoid a waste of time in a cell with a weak signal, and reduce a cell camping delay.

Optionally, the method for selecting a cell to be camped on includes step 507, which is to decode RMSI of the cell continuing waiting to be camped on, to obtain an RMSI decoding result.

After the PBCH is decoded, the RMSI of the selected cell continuing waiting to be camped on is decoded, to obtain an SIB. For example, the RMSI decoding result includes the SIB, and system information included in the SIB may include, for example, some scheduling information lists, a length and a period of a time window for sending a message, and a radio channel configuration parameter. For example, the SIB information includes a SIB 1, and the SIB 1 includes information such as cell access information and a minimum access level. It should be understood that the terminal needs to measure a to-be-selected cell, to perform channel quality evaluation and determine whether the to-be-selected cell meets a camping criterion. The SIB 1 includes a parameter for evaluating channel quality. The terminal may determine, by parsing the SIB 1, whether a current cell is suitable for being camped on.

Optionally, the method for selecting a cell to be camped on includes step 508, which is to judge whether decoding of the RMSI of the cell continuing waiting to be camped on fails.

In an optional case, if decoding of the RMSI of the selected cell continuing waiting to be camped on fails, step 501 to step 508 are performed again, and this process is performed at most once. If the RMSI is successfully decoded in the second time, step 509 is performed. If the RMSI fails to be decoded in the second time, cell camping fails. For example, as shown in FIG. 5, if decoding of the RMSI of the cell continuing waiting to be camped on fails, it is determined whether decoding of the RMSI fails for the first time. If decoding of the RMSI fails for the first time, step 501 is performed. If decoding of the RMSI of the cell continuing waiting to be camped on fails again, cell camping fails.

The method for selecting a cell to be camped on includes step 509, when the RMSI decoding result of the cell continuing waiting to be camped on indicates that the cell continuing waiting to be camped on meets a camping criterion, determine the cell continuing waiting to be camped on as the cell to be camped on.

In an optional case, the camping criterion may be an S criterion, and the S criterion includes evaluation on cell signal power and evaluation on a cell service level. For a specific formula of the S criterion, refer to other approaches. Details are not described herein. After channel quality of a cell meets the S criterion, the cell may be selected as the cell to be camped on. It should be understood that, in addition to the S criterion, there may be another determining criterion for selecting a cell to be camped on, provided that signal strength (including signal quality, signal power, and the like) and a service level of the selected cell meet a communication requirement. For example, when the information included in the SIB 1 obtained by decoding the RMSI meets the S criterion, it indicates that the current cell meets the camping criterion, and the selected cell continuing waiting to be camped on is used as the cell to be camped on. Optionally, a subsequent random access process may be performed in the cell to be camped on.

In this embodiment of this application, the N cells waiting to be camped on are selected, based on the calculated signal strength metric of the cell and the barred cell list stored on the terminal, from a cell set found through initial receive beam sweeping, and the PBCHs of all the N cells waiting to be camped on are sequentially decoded. In addition, the RMSI of the cell that is not barred from being camped on and that has a strongest signal is selected from the at least one cell whose PBCH is successfully decoded. Because the cell barred from being camped on is screened out, and the cell with the strongest signal is selected, a cell camping success rate is greatly increased, and a waste of time in a cell with a weak signal is avoided such that a cell camping delay is reduced.

Figure 6:
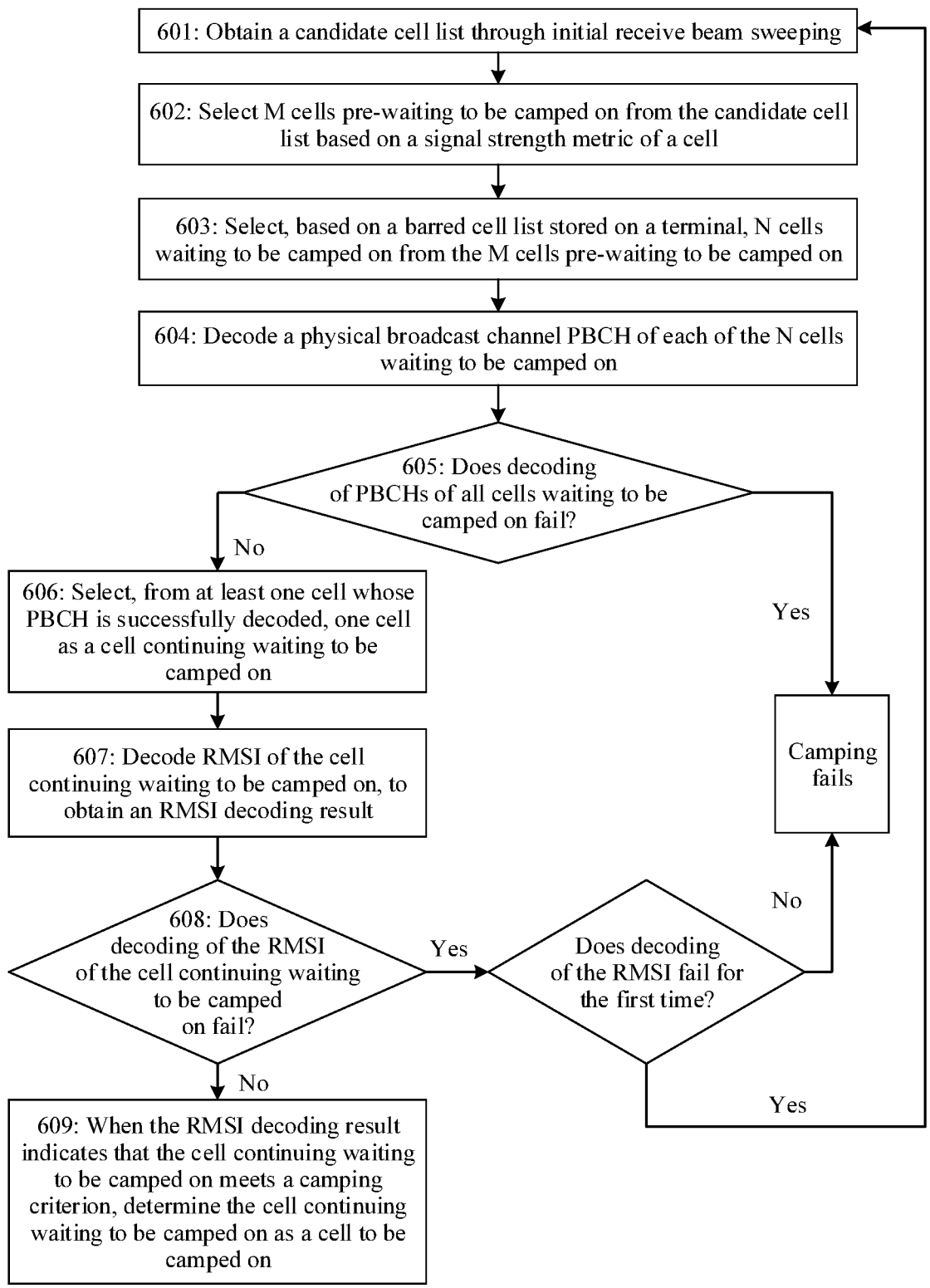
FIG. 6 is a schematic flowchart of another method for selecting a cell to be camped on according to an embodiment of this application.

FIG. 6 is a schematic flowchart of another method for selecting a cell to be camped on according to an embodiment of this application. Similarly, for ease of understanding, the method for selecting a cell to be camped is described in a form of steps in this embodiment of this application. Although a sequence of the method is shown in the method flowchart 6, in some cases, the described steps may be performed in a sequence different from that described herein.

Optionally, the method for selecting a cell to be camped on includes step 601 which is to obtain a candidate cell list through initial receive beam sweeping.

Specifically, a terminal performs initial receive beam sweeping near a frequency, to obtain all cells that can be found near the frequency. All these cells that can be found constitute the candidate cell list. In other words, the candidate cell list is a set of all cells that can be found near the frequency. A meaning of the list mentioned in this embodiment of this application is the same as a meaning of a "set" in mathematics. Optionally, the frequency may be obtained by the terminal based on frequency measurement, or may be obtained based on prior information. A method for obtaining a frequency for receive beam sweeping is not limited in this embodiment of this application. For example, UE receives an SSB on each receive beam, to perform cell search, obtains a PCI based on the cell search, and completes downlink synchronization. For example, the candidate cell list may include a PCI obtained through search.

The method for selecting a cell to be camped on includes step 602, which is to select M cells pre-waiting to be camped on from the candidate cell list based on a signal strength metric of a cell.

Step 602 is the same as step 503. For details, refer to the description of step 503.

The method for selecting a cell to be camped on includes step 603, which is to select, based on a barred cell list of the terminal, N cells waiting to be camped on from the M cells pre-waiting to be camped on.

In this method embodiment, the M cells pre-waiting to be camped on in step 602 are selected, based on a signal strength metric of a cell, from a cell set found through initial receive beam sweeping. However, the cell set found through initial receive beam sweeping by the terminal may include a barred cell, the barred cell in the M cells pre-waiting to be camped on is removed to obtain the N cells waiting to be camped on, and a subsequent camping process is further performed on the obtained N cells waiting to be camped on. This can avoid a waste of time in the barred cell, and reduce a cell camping delay. For example, the terminal usually stores a barred cell list. For a description of the barred cell list, refer to step 502. A cell barred from being camped on is removed based on the barred cell list of the terminal from the M cells pre-waiting to be camped on, to obtain the N cells waiting to be camped on. For example, it is determined whether each cell in the M cells pre-waiting to be camped on is in the barred cell list of the terminal. If a cell is in the M cells pre-waiting to be camped on but is not in the barred cell list, the cell is added to a set of the N cells waiting to be camped on. Optionally, if a cell in the M cells pre-waiting to be camped on is in the barred cell list, but the cell currently does not meet a barring condition, for example, a current signal strength metric of the cell is greater than a preset threshold, although the cell is in the barred cell list, the cell is not barred from being camped on, and then the cell is also added to the set of the N cells waiting to be camped on. Optionally, N is an integer not greater than M. Optionally, when none of the M cells pre-waiting to be camped on is in the barred cell list, M is equal to N. When a cell in the barred cell list exists in the M cells pre-waiting to be camped on, N is less than M. In an optional case, when none of the M cells pre-waiting to be camped on is in the barred cell list, several relatively weak cells may be removed based on a signal strength metric to obtain the N cells waiting to be camped on. In this case, N is less than M.

The method for selecting a cell to be camped on includes step 604, which is to decode a PBCH of each of the N cells waiting to be camped on.

Step 604 is the same as step 504. For details, refer to the description of step 504.

Optionally, the method for selecting a cell to be camped on includes step 605, which is to judge whether decoding of PBCHs of all cells waiting to be camped on fails.

In an optional case, if decoding of the PBCHs of all cells waiting to be camped on fails, a cell suitable for being camped on is not found in this initial receive beam sweeping process, and cell camping fails. If decoding of the PBCHs of not all the cells waiting to be camped on fails, step 606 is performed.

The method for selecting a cell to be camped on includes step 606, which is to select, from at least one cell whose PBCH is successfully decoded, one cell as a cell continuing waiting to be camped on.

Step 606 is the same as step 506. For details, refer to the description of step 506.

Optionally, the method for selecting a cell to be camped on includes step 607, which is to decode RMSI of the cell continuing waiting to be camped on, to obtain an RMSI decoding result.

Step 607 is the same as step 507. For details, refer to the description of step 507.

Optionally, the method for selecting a cell to be camped on includes step 608, which is to judge whether decoding of the RMSI of the cell continuing waiting to be camped on fails.

In an optional case, if decoding of the RMSI of the selected cell continuing waiting to be camped on fails, step 601 to step 608 are performed again, and this process is performed at most once. If an RMSI decoding result obtained in the second time meets a camping criterion, cell camping succeeds. If an RMSI decoding result obtained in the second time still does not meet a camping criterion, cell camping fails. For example, as shown in FIG. 6, if decoding of the RMSI of the cell continuing waiting to be camped on fails, it is determined whether decoding of the RMSI fails for the first time. If decoding of the RMSI fails for the first time, step 601 is performed. If decoding of the RMSI of the cell continuing waiting to be camped on fails again, cell camping fails.

The method for selecting a cell to be camped on includes step 609, which is to when, the RMSI decoding result of the cell continuing waiting to be camped on indicates that the cell continuing waiting to be camped on meets a camping criterion, determine the cell continuing waiting to be camped on as the cell to be camped on.

Step 609 is the same as step 509. For details, refer to the description of step 509.

In this embodiment of this application, cells with a relatively strong signal are first selected from a cell set found through initial receive beam sweeping, and then a barred cell is screened out based on the barred cell list of the terminal to obtain a set of cells waiting to be camped on, then PBCHs of the set of the cells waiting to be camped on are decoded, a cell that is not barred from being camped on and has a strongest signal is selected from at least one cell whose PBCH is successfully decoded, and RMSI of the cell is decoded. This avoids a waste of time in a cell with a weak signal or the cell barred from being camped on, reduces a cell camping delay, and increases a cell camping success rate.

After the method for selecting a cell to be camped on in this embodiment of this application is described, the following describes an apparatus for selecting a cell to be camped on according to an embodiment of this application.

Figure 7:
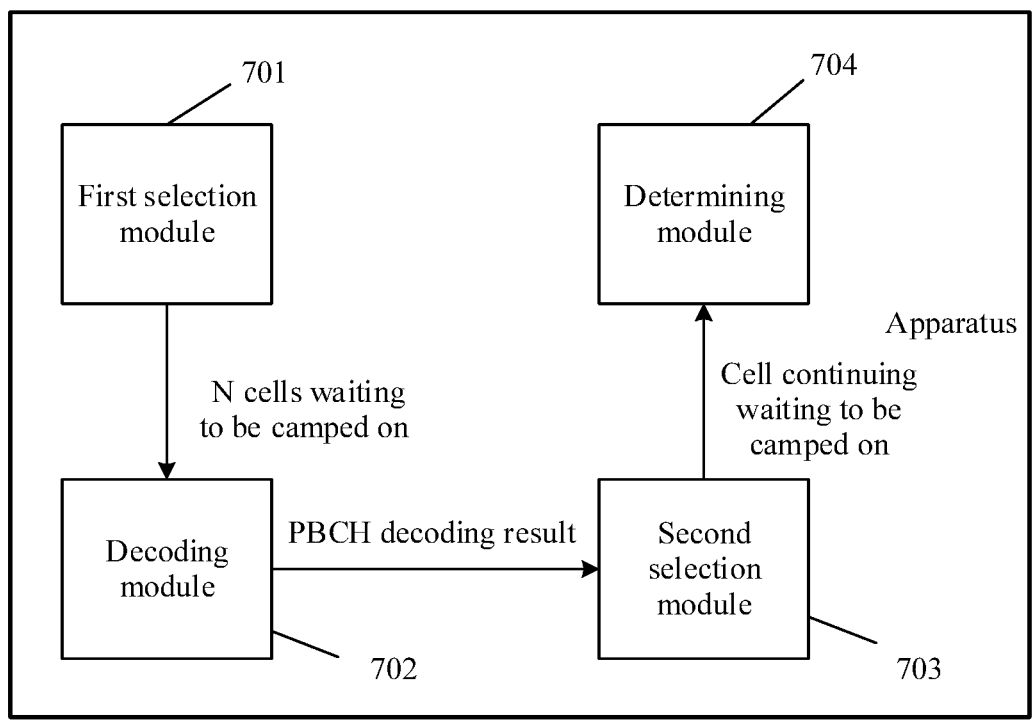
FIG. 7 is a schematic diagram of an apparatus for selecting a cell to be camped on according to an embodiment of this application.

As shown in FIG. 7, an embodiment of this application provides an apparatus 700 for selecting a cell to be camped on. The apparatus 700 includes the following modules.

A first selection module 701 is configured to select N cells waiting to be camped on from a candidate cell list. In an optional case, N is an integer not less than 2, and N is not greater than a quantity of cells in the candidate cell list. For example, the first selection module 701 may be further configured to perform the methods in step 503 and step 602. For details, refer to the descriptions of step 503 and step 602 in the method embodiments. Details are not described herein again.

A decoding module 702 is configured to decode a PBCH of each of the N cells waiting to be camped on. For example, processes of decoding the PBCHs of the N cells waiting to be camped on may be sequentially performed. In an optional case, the processes may be simultaneously performed. For example, the decoding module 702 may be further configured to perform the methods in step 504 and step 604. For details of decoding the PBCHs of the cells, refer to the descriptions of step 504 and step 604 in the method embodiments. Details are not described herein again. In an optional case, the decoding module 702 may be further configured to perform the methods in step 507 and step 607, to decode RMSI of a cell continuing waiting to be camped on. For details, refer to the descriptions of step 507 and step 607.

A second selection module 703 is configured to select, from at least one cell whose PBCH is successfully decoded, one cell as a cell continuing waiting to be camped on. For example, the second selection module 703 may be configured to perform the methods in step 506 and step 606. For details, refer to the descriptions of step 506 and step 606 in the method embodiments. Details are not described herein again.

A determining module 704 is configured to, when an RMSI decoding result of the cell continuing waiting to be camped on indicates that the cell continuing waiting to be camped on meets a camping criterion, determine the cell continuing waiting to be camped on as the cell to be camped on. For example, the determining module 704 may be configured to perform the methods in step 509 and step 609. For details, refer to the descriptions of step 509 and step 609 in the method embodiments. Details are not described herein again.

The apparatus provided in this embodiment of this application sequentially decodes the PBCHs of the selected cells, selects one cell from the cells whose PBCHs are successfully decoded, and decodes RMSI of the cell. Decoding of the RMSI of the selected cell can increase a cell camping success rate, and avoid decoding the RMSI for a plurality of times, thereby reducing a cell camping delay.

Figure 8:
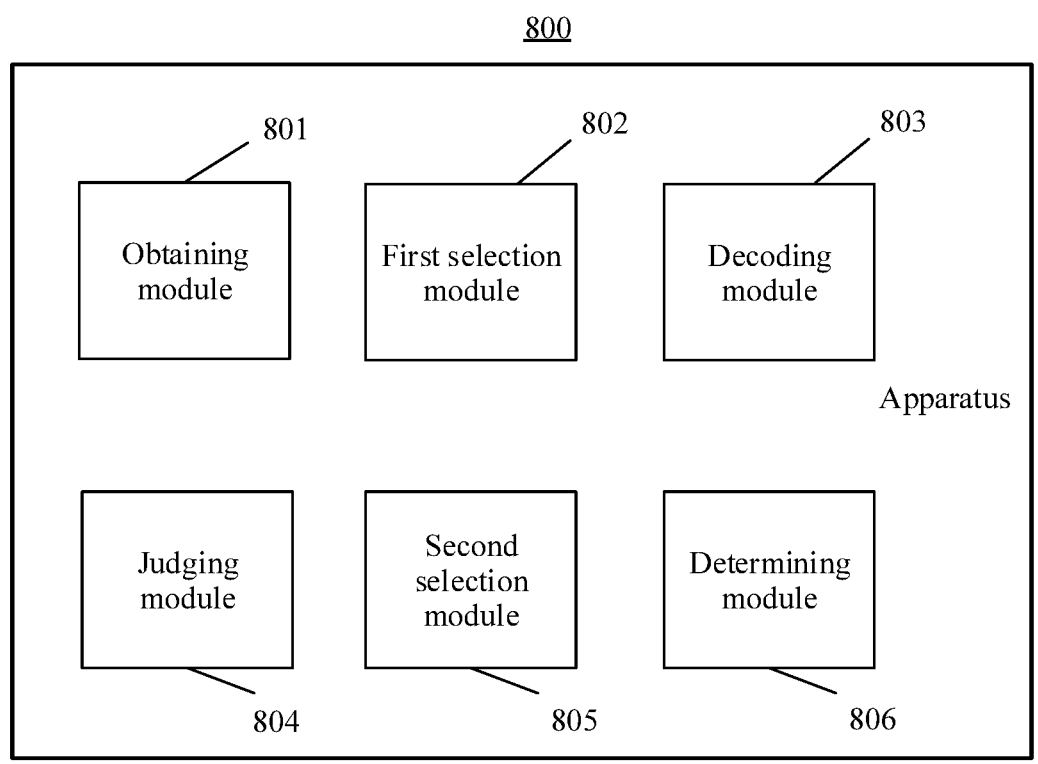
FIG. 8 is a schematic diagram of another apparatus for selecting a cell to be camped on according to an embodiment of this application.

As shown in FIG. 8, an embodiment of this application provides another apparatus 800 for selecting a cell to be camped on. The apparatus 800 includes the following modules.

An obtaining module 801 is configured to obtain an initial cell list through initial receive beam sweeping. Optionally, the obtaining module 801 is further configured to obtain a candidate cell list based on a barred cell list of the apparatus and the initial cell list. For example, the obtaining module 801 may be further configured to perform the methods in step 501, step 502, and step 601. For details, refer to the descriptions of step 501, step 502, and step 601 in the method embodiments. Details are not described herein again. In an optional case, the obtaining module 801 may include a first obtaining module and a second obtaining module. For example, the first obtaining module may be further configured to perform the method in step 501, and the second obtaining module may be further configured to perform the method in step 502. Optionally, the methods in step 501 and step 502 may alternatively be performed by a same obtaining module, and the first obtaining module and the second obtaining module do not need to be distinguished. This is not limited in this embodiment of this application.

A first selection module 802 is configured to select N cells waiting to be camped on from a candidate cell list. The first selection module 802 is the same as the first selection module 701. For details, refer to the description of the first selection module 701.

A decoding module 803 is configured to decode a PBCH of each of the N cells waiting to be camped on, or configured to decode RMSI of a cell continuing waiting to be camped on. The decoding module 803 is the same as the decoding module 702. For details, refer to the description of the decoding module 702 in the foregoing apparatus embodiment.

A judgment module 804 is configured to judge at least one of whether decoding of PBCHs of all cells waiting to be camped on fails or whether decoding of the RMSI of the cell continuing waiting to be camped on fails. For example, the judgment module 804 may be further configured to perform the methods in step 505, step 508, step 605, and step 608. For details, refer to the descriptions of step 505, step 508, step 605, and step 608 in the method embodiments. Details are not described herein again. In an optional case, the judgment module 804 may include a first judgment module and a second judgment module. For example, the first judgment module may be configured to perform the methods in step 505 and step 605, in an embodiment configured to judge whether decoding of the PBCHs of all the cells waiting to be camped on fails. The second judgment module may be configured to perform the methods in step 508 and step 608, in an embodiment configured to judge whether decoding of the RMSI of the cell continuing waiting to be camped on fails. In an optional case, all judging steps in the method embodiments may be completed by a same judgment module, and the first judgment module and the second judgment module do not need to be distinguished. This is not limited in this embodiment of this application.

A second obtaining module 805 is configured to select, from at least one cell whose PBCH is successfully decoded, one cell as a cell continuing waiting to be camped on. A function of the second obtaining module 805 is the same as a function of the second selection module 703 in FIG. 7. Refer to the description of the second selection module 703.

A determining module 806 is configured to, when an RMSI decoding result of the cell continuing waiting to be camped on indicates that the cell continuing waiting to be camped on meets a camping criterion, determine the cell continuing waiting to be camped on as the cell to be camped on. A specific function of the determining module 806 is the same as a specific function of the determining module 704 in FIG. 7. For details, refer to the description of the method of the determining module 704.

The component modules of the foregoing apparatus may be implemented using hardware, a software functional unit, or a combination thereof. When the component modules are implemented using hardware, at least one module in the apparatus may be a logic module formed by a logic integrated circuit, and the logic integrated circuit may include a transistor, a logic gate, or a circuit function module.

The apparatus embodiments provided in this application are merely examples. Division into units shown in FIG. 7 and FIG. 8 is merely logical function division and may be other division in an actual implementation. For example, a plurality of modules may be combined or integrated into another system. Coupling between the modules may be implemented through some interfaces. The interfaces are usually electrical communications interfaces, but may alternatively be mechanical interfaces or interfaces in another form. Therefore, the modules described as separate parts may or may not be physically separate, in an embodiment, may be located in one position, or may be distributed in different positions of a same device or different devices.

The foregoing describes the apparatus in the embodiments of this application from a perspective of a modular functional entity. The following describes, with reference to the terminal 30 shown in FIG. 2, an apparatus at a hardware layer according to an embodiment of this application. It should be understood that the terminal 30 shown in FIG. 2 is an implementation of the apparatus according to the embodiments of this application.

The communications processor 3010 in the terminal 30 is configured to perform some or all functions of any one of the foregoing method embodiments. For a specific type of the communications processor 3010, refer to the description of the processor 301 in the terminal 30. The memory 302 is configured to store a related instruction. When the related instruction is run on a computer or a processor, any method provided in the embodiments of this application may be implemented. For details of a type of the memory, refer to the description of the memory 302 in the terminal 30.

The output device 304, the input device 305, the antenna 31, and the connector have been described in detail when FIG. 2 is described, and details are not described herein again.

An embodiment of this application further provides a computer-readable storage medium. The computer-readable storage medium stores an instruction. When the instruction is run on a computer, the computer is enabled to perform one or more steps in any one of the foregoing methods. When the component modules of the apparatus for selecting a cell to be camped on are implemented in the form of a software function unit and sold or used as an independent product, the component modules may be stored in a computer-readable storage medium.

Based on such an understanding, an embodiment of this application further provides a computer program product including an instruction. The technical solutions of this application essentially, or the part contributing to other approaches, or all or some of the technical solutions may be implemented in the form of a software product. The computer software product is stored in a storage medium and includes several instructions for enabling a computer device (which may be a personal computer, a server, a network device, or the like) or a processor in a computer device to perform all or some of the steps of the methods described in the embodiments of this application. For a type of the storage medium, refer to the related description of the memory 302.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without making the essence of corresponding technical solutions depart from the scope of the technical solutions of the embodiments of this application. For example, for some specific operations in the apparatus embodiment, refer to the foregoing method embodiments.

What is claimed is:

1. A method for selecting a cell to be camped on, the method comprising:
   obtaining an initial cell list through initial receive beam sweeping;
   obtaining a candidate cell list based on a barred cell list of a terminal and the initial cell list;
   determining that a second cell of a first plurality of cells is in the candidate cell list by determining that the second cell is in the initial cell list and the barred cell list and does not meet a barring condition;
   selecting the first plurality of cells waiting to be camped on from a second plurality of cells in the candidate cell list;
   attempting to decode a physical broadcast channel (PBCH) of all cells sequentially of the first plurality of cells;
   after attempting to decode the PBCH of all cells sequentially of the first plurality of cells, obtaining the second cell whose PBCH is successfully decoded;
   selecting the second cell to be remaining minimum system information (RMSI) decoded;
   decoding RMSI of the second cell to obtain an RMSI decoding result; and
   selecting the second cell as a cell to be camped on in response to the RMSI decoding result indicating that the second cell meets a camping criterion.

2. The method of claim 1, wherein before selecting the first plurality of cells, the method further comprises
   selecting the first plurality of cells from the second plurality of cells in the candidate cell list based on a signal strength metric of each of the second plurality of cells.

3. The method of claim 2, wherein the barred cell list comprises at least one of:
   a cell that is barred from being camped on based on a historical PBCH decoding result; or
   a cell that is not barred from being camped on based on the historical PBCH decoding result and that comprises a previous RMSI that fails to be decoded.

4. The method of claim 2, further comprising:
   calculating the signal strength metric of each of the second plurality of cells; and
   selecting, from the second plurality of cells, cells with signal strength metrics within a top ranking as the first plurality of cells.

5. The method of claim 2, wherein the signal strength metric comprises at least one of a reference signal received power (RSRP), a reference signal received quality (RSRQ), or a signal-to-interference-plus-noise ratio (SINR).

6. The method of claim 1, wherein before selecting the first plurality of cells, the method further comprises:
   selecting, from the second plurality of cells, a fourth plurality of cells pre-waiting to be camped on based on a signal strength metric of a cell, wherein a quantity of the fourth plurality of cells is greater than or equal to a quantity of the first plurality of cells; and
   selecting the first plurality of cells from the fourth plurality of cells based on the barred cell list of the terminal.

7. The method of claim 1, further comprising
   selecting, from a third plurality of cells whose PBCH is successfully decoded, a cell with a largest signal strength metric as the second cell.

8. The method of claim 1, further comprising:
   determining the second cell does not meet the barring condition based on a current condition of the second cell satisfying the barring condition; and
   adding the second cell to the candidate cell list.

9. The method of claim 8, wherein the barring condition is a preset threshold.

10. An apparatus for selecting a cell to be camped on, the apparatus comprising:
a processor; and
a memory coupled to the processor and configured to store instructions that, when executed by the processor, cause the apparatus to be configured to:
obtain an initial cell list through initial receive beam sweeping;
obtain a candidate cell list based on a barred cell list of a terminal and the initial cell list;
determine that a second cell of a first plurality of cells is in the candidate cell list by determining that the second cell is in the initial cell list and the barred cell list and does not meet a barring condition;
select the first plurality of cells waiting to be camped on from a second plurality of cells in the candidate cell list;
attempt to decode a physical broadcast channel (PBCH) of all cells sequentially of the first plurality of cells;
after attempting to decode the PBCH of all cells sequentially of the first plurality of cells, obtain the second cell whose PBCH is successfully decoded;
select the second cell to be remaining minimum system information (RMSI) decoded;
decode RMSI of the second cell to obtain an RMSI decoding result; and
select the second cell as a cell to be camped on when the RMSI decoding result indicates that the second cell meets a camping criterion.

11. The apparatus of claim 10, wherein the instructions further cause the processor to select the first plurality of cells from the second plurality of cells in the candidate cell list based on a signal strength metric of each of the second plurality of cells.

12. The apparatus of claim 11, wherein the barred cell list comprises at least one of:
a cell that is barred from being camped on based on a historical PBCH decoding result; or
a cell that is not barred from being camped on based on the historical PBCH decoding result and that comprises a previous RMSI that fails to be decoded.

13. The apparatus of claim 11, wherein the instructions further cause the processor to:
calculate the signal strength metric of each of the second plurality of cells in the candidate cell list; and
select, from the second plurality of cells in the candidate cell list, cells with signal strength metrics within a top ranking as the first plurality of cells.

14. The apparatus of claim 11, wherein the signal strength metric comprises at least one of reference signal received power (RSRP), reference signal received quality (RSRQ), or a signal-to-interference-plus-noise ratio (SINR).

15. The apparatus of claim 10, wherein the instructions further cause the processor to:
select, from the second plurality of cells in the candidate cell list, a fourth plurality of cells pre-waiting to be camped on based on a signal strength metric of a cell, wherein a quantity of the fourth plurality of cells is greater than or equal to a quantity of the first plurality of cells; and
select the first plurality of cells from the fourth plurality of cells based on the barred cell list of the apparatus.

16. The apparatus of claim 10, wherein the instructions further cause the processor to
select, from a third plurality of cells whose PBCH is successfully decoded, a cell with a largest signal strength metric as the second cell.

17. The apparatus of claim 10, wherein the instructions further cause the processor to:
determine the second cell does not meet the barring condition based on a current condition of the second cell satisfying the barring condition; and
add the second cell to the candidate cell list.

18. A computer program product comprising computer-executable instructions that are stored on a non-transitory computer-readable medium and that, when executed by a processor, cause an apparatus to:
obtain an initial cell list through initial receive beam sweeping;
obtain a candidate cell list based on a barred cell list of a terminal and the initial cell list;
determine that a second cell of a first plurality of cells is in the candidate cell list by determining that the second cell is in the initial cell list and the barred cell list and does not meet a barring condition;
select the first plurality of cells waiting to be camped on from a second plurality of cells in the candidate cell list;
attempt to decode a physical broadcast channel (PBCH) of all cells sequentially of the first plurality of cells;
after attempting to decode the PBCH of all cells sequentially of the first plurality of cells, obtain the second cell whose PBCH is successfully decoded;
select the second cell to be remaining minimum system information (RMSI) decoded;
decode RMSI of the second cell to obtain an RMSI decoding result; and
select the second cell as a cell to be camped on when the RMSI decoding result indicates that the second cell meets a camping criterion.

19. The computer program product of claim 18, wherein the instructions further cause the apparatus to select the first plurality of cells from the second plurality of cells in the candidate cell list based on a signal strength metric of each of the second plurality of cells.

20. The computer program product of claim 18, wherein the instructions further cause the apparatus to:
determine the second cell does not meet the barring condition based on a current condition of the second cell satisfying the barring condition; and
add the second cell to the candidate cell list.

* * * * *